United States Patent
Viola

(10) Patent No.: US 6,707,292 B2
(45) Date of Patent: Mar. 16, 2004

(54) MAGNETIC CIRCUIT FOR A ROTARY POSITION SENSOR

(75) Inventor: Jeffrey Viola, Berkley, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/205,689

(22) Filed: Jul. 26, 2002

(65) Prior Publication Data

US 2004/0017186 A1 Jan. 29, 2004

(51) Int. Cl.[7] .............................. G01B 7/30; G01B 7/14
(52) U.S. Cl. .............................. 324/207.2; 324/207.21; 123/617
(58) Field of Search ..................... 324/207.2, 207.12, 324/207.25, 235, 251, 252, 207.21; 123/617; 310/156.01, 156.05; 73/119 R, 520.01

(56) References Cited

U.S. PATENT DOCUMENTS

| | | | |
|---|---|---|---|
| 3,340,467 A | * | 9/1967 | Whanna ..................... 324/228 |
| 3,530,317 A | * | 9/1970 | Lang ........................... 310/10 |
| 4,444,444 A | | 4/1984 | Benedetti et al. |
| 4,686,404 A | | 8/1987 | Nakazeki et al. |
| 4,723,735 A | | 2/1988 | Eisenhaure et al. |
| 5,164,668 A | | 11/1992 | Alfors |
| 5,574,340 A | | 11/1996 | Bisel et al. |
| 5,670,875 A | | 9/1997 | Alfors et al. |
| 5,694,039 A | * | 12/1997 | Alfors ..................... 324/207.2 |
| 6,181,040 B1 | | 1/2001 | Schöb |
| 6,222,290 B1 | | 4/2001 | Schöb et al. |
| 6,249,067 B1 | | 6/2001 | Schöb et al. |
| 6,275,027 B1 | * | 8/2001 | Kogure et al. ........... 324/207.2 |
| 6,288,534 B1 | | 9/2001 | Starkweather et al. |
| 6,462,537 B2 | * | 10/2002 | Kogure et al. ........... 324/207.2 |
| 6,518,750 B1 | | 2/2003 | Lin et al. |

FOREIGN PATENT DOCUMENTS

| | | |
|---|---|---|
| DE | 101 39 154 A1 | 2/2002 |
| EP | 0 575 971 A1 | 12/1993 |
| WO | WO97/43602 | 11/1997 |

* cited by examiner

Primary Examiner—Walter E. Snow
Assistant Examiner—Reena Aurora
(74) Attorney, Agent, or Firm—Brinks Hofer Gilson & Lione

(57) ABSTRACT

An angular position sensor is provided including a rotatable magnet and at least one magnetically sensitive device. The at least one magnetically sensitive device is preferably a plurality of Hall effect sensors disposed on a circuit board for processing the generated electrical signals. The present invention includes a pair of focusing members designed to transmit and uniformly focus a magnetic field across the magnetically sensitive device, wherein the focusing members are tailored to be substantially planar and provide a uniform magnetic field gradient across the magnetically sensitive device. In a preferred embodiment, the present invention also includes at least one shielding member. The angular position sensor may be adapted for use in a control system for the electronic monitoring and control of the throttle plate position in a motor vehicle.

20 Claims, 5 Drawing Sheets

MAGNETIC CIRCUIT FOR A ROTARY POSITION SENSOR

FIELD OF THE INVENTION

The present invention relates generally to angular position sensor, and more particularly to an angular position sensor that includes a rotatable magnet and a magnetically sensitive device to measure the angular position of a throttle plate.

BACKGROUND AND SUMMARY OF THE INVENTION

The angular position of a rotatable member is a parameter of interest in numerous applications. In particular, angular position sensors are necessary to determine the angle of a throttle plate in an internal combustion engine. The angle of the throttle plate determines the amount of fresh air that is being utilized in the combustion process, and thus partially determines the power output of the engine. Because slight angular deviations in the throttle plate angle are important for systematic engine control, it is imperative that the angular position sensor have very high tolerance.

Suitable angular position sensors have historically used a rotatable magnet that is electromagnetically coupled to a sensing device, such as a Hall effect sensor. However, in certain configurations, the readings of the sensing device may have been compromised. A Hall effect sensor, for example, operates by generating an electrical current in response to a transverse magnetic field, such as the one caused by the rotatable magnet. As the magnitude of any magnetic field obeys the inverse-square law, any slight alternation of the distance between the Hall sensor and the field generating member would compromise the angular position reading.

In response to the foregoing concerns, one sensor provided a pair of pole pieces for transmitting the magnetic field of the rotatable magnet to the Hall effect sensor, which was preferably located a distance from the rotatable magnet. The pole pieces were symmetrical about an axis sharing the rotatable magnet and the Hall effect sensor, and further described as substantially L-shaped or substantially C-shaped. The Hall effect sensor was preferably placed at the narrow gap at the bottom of the L-pairing or C-pairing such that the transmitted magnetic field passed perpendicularly through the Hall effect sensor.

Although the angular position sensor contemplated by the foregoing sensor solves a number of prior limitations, it does not completely eradicate the technical obstacles of angular position sensing. For example, a typical angular position sensor will use multiple Hall effect sensors to ensure the accuracy of the measurements, due in large part to the potential errors in spatial variation of the magnetic field. Nevertheless, the above system focuses the magnetic field to a narrow gap, through which the magnetic field will vary greatly. Because the area of the surfaces projecting the magnetic field is small relative to the size of the sensing mechanism, the sensing mechanism is subject to increased gradient changes in the magnetic field. Consequently, if multiple Hall effect sensors have different measurements, it is not possible to settle the discrepancy based upon spatial variation of the sensors alone—it is also possible that the magnetic field is not sufficiently uniform to ensure accurate readings.

Moreover, as noted previously, a common application of angular position sensors is as part of a control system of an internal combustion engine. A side effect of locating the angular position sensor in such an environment is the presence of unwanted and unaccountable electromagnetic fields. Electrical current, rotors, and stators are all moving within the vehicle engine compartment, and they are all emanating magnetic fields in the direction of the angular position sensor. The foregoing sensor permits electromagnetic fields to enter the measurement apparatus through the end opposite to the Hall effect sensors. Due to the sensitivity of the sensors, any electromagnetic interference from external devices compromises the accuracy of the angular measurements.

Accordingly, the present invention provides an angular position sensor that uniformly focuses a magnetic field to a plurality of sensing devices while preserving the purity of that field. In particular, the present invention is an angular position sensor including a rotatable magnet disposed for rotation about a first axis and generating a variable magnetic field in response to rotation about the first axis. Also included is at least one magnetically sensitive device disposed remotely from the rotatable magnet along a second axis, where the second axis is perpendicular to the first axis. The at least one magnetically sensitive device is preferably a plurality of Hall effect sensors disposed on a circuit board for processing the generated electrical signals. The use of multiple Hall effect sensors is particularly applicable in providing redundancy to electronic vehicle control systems, such as throttle position regulation.

The focusing element of the angular position sensors includes six total segments. A first pole piece has a first segment, a second segment, and a third segment; and a second pole piece has a fourth segment, a fifth segment, and a sixth segment. The first segment and the fourth segment are disposed about the second axis at a first distance such that the first segment and the fourth segment are mutually parallel to the second axis. The third segment and the sixth segment are disposed about the second axis at a second distance such that the third segment and the sixth segment are mutually parallel to the second axis, the second distance being less than the first distance. The second segment and the fifth segment are disposed about the second axis such that the second segment and the fifth segment are at an angle to the second axis so that the pair of pole pieces converge on the second axis. Additionally, the angular position sensor of the present invention further includes a shielding member disposed about the first segment and the fourth segment for effectively shielding the angular position sensor from background magnetic fields. Alternatively, a second shielding member may be placed about the third segment and the sixth segment for preserving the uniformity of the magnetic field therebetween.

DETAILED DESCRIPTION OF THE INVENTION

Figure 1:
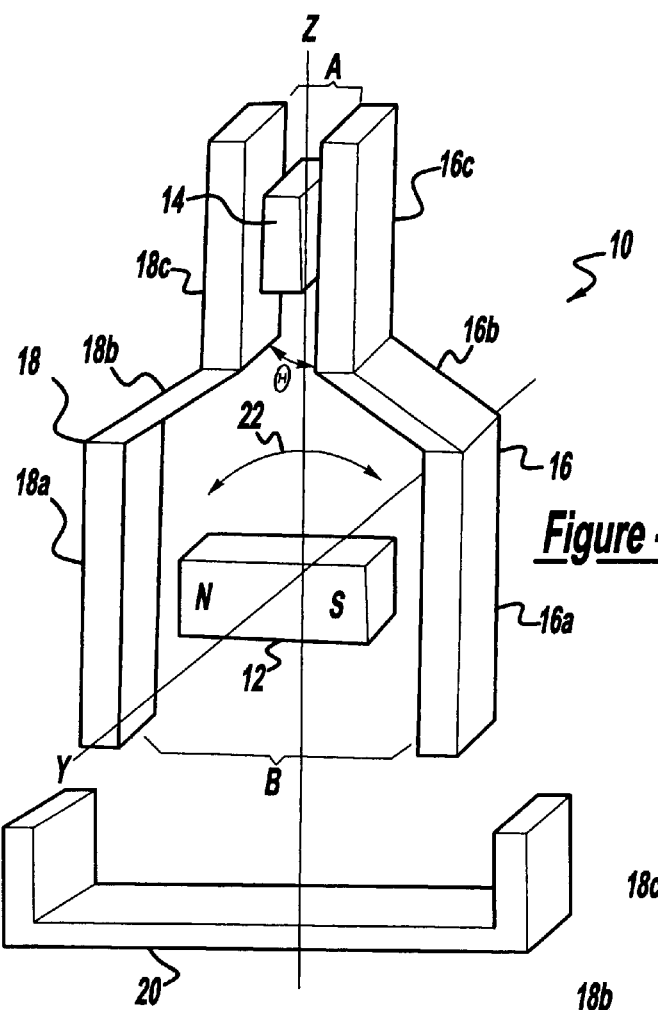
FIG. 1 is schematic diagram of the angular position sensor of the present invention.

In accordance with the present invention FIG. 1 is a schematic diagram of the angular position sensor 10 of the present invention. In order to better illustrate the relative orientation of the various components of the angular position sensor 10, the diagram includes a pair of perpendicular axis. The first, or Y, axis projects in a transverse direction along the depth of the angular position sensor 10; and the second, or Z, axis projects longitudinally through the length angular position sensor 10.

An angular position sensor 10 according to the present invention includes, as its primary components, a rotatable magnet 12, a magnetically sensitive device 14, and a pair of pole pieces 16, 18. The respective components are described further below.

The angular position sensor 10 includes a rotatable magnet 12 having a north pole designated N and a south pole designated S. The rotatable magnet 12 is rotatable along the arrow 22, such that the rotation of the rotatable magnet 12 is confined to a plane normal to the Y axis. As shown, the rotatable magnet 12 is block-like in nature. However, in alternate embodiments, the rotatable magnet 12 may take any form suitable for rotation and the production of uniform magnetic fields.

The angular position sensor 10 also includes a magnetically sensitive device 14, disposed along the Y axis at a predetermined distance from the rotatable magnet 12. In a preferred embodiment, the magnetically sensitive device 14 includes at least one Hall effect sensor integrated into a circuit board adapted for detecting, amplifying, and transmitting an electrical signal to a controller 26, shown in FIG. 7. The magnetically sensitive device 14 is shown as block-like in nature, as it is known that the Hall effect sensors and associated circuitry may be integrated into a single unit having a protective cover for durability and reliability. Hereinafter, references to the magnetically sensitive device 14 will be understood to refer to at least one Hall effect sensor attached to the necessary circuit components.

The angular position sensor 10 further includes a pair of pole pieces 16, 18 oriented symmetrically about the Z axis. A first pole piece 16 is composed of a first segment 16a, a second segment 16b, and a third segment 16c. A second pole piece 18 is composed of a fourth segment 18a, a fifth segment 18b, and a sixth segment 18c. In a preferred embodiment, the angular position sensor 10 further includes a shielding member 20 disposed near the first segment 16a and the fourth segment 18a. The shielding member 20 is designed to mitigate the influence of external magnetic fields, i.e. magnetic fields not generated by the rotatable magnet 12.

The first segment 16a and fourth segment 18a are juxtaposed about the intersection of the Y and Z axes, which coincides with a preferred disposition of the rotatable magnet 12. The first segment 16a and the fourth segment 18a are parallel to the Y axis, and separated by a distance B from each other. The second segment 16b and the fifth segment 18b converge on the Y axis at an angle θ, where θ can be any angle greater than zero degrees and less than ninety degrees. The third segment 16c and sixth segment 18c are parallel to the Y axis, disposed about the magnetically sensitive device 14 and separated by a distance A. Because of the constraints on the value of the angle θ, the distance A must always be less than the distance B, thereby rendering the first and second pole pieces 16, 18 focusing devices for a magnetic field 30, shown in FIGS. 2–5.

The rotatable magnet 12 is permanently polarized, irradiating a magnetic field that protrudes from the north pole, N, and wraps around to reenter the rotatable magnet 12 at the south pole, S. As the rotatable magnet 12 is rotated, the field density, or flux density, changes in space. The changes in flux density are detected by the magnetically sensitive device 14, which generates an electrical signal in response thereto indicative of the changes.

The first and second pole pieces 16, 18 of the present invention serve to focus and regulate the magnetic flux density of the rotatable magnet 12. In a preferred embodiment, the first segment 16a and the fourth segment 16b are aligned to transmit the magnetic field. The second segment 16b and the fifth segment 18b further transmit the magnetic field towards the magnetically sensitive device 14. In doing so, the gap between the pole pieces is reduced from a width B to a smaller width A, as noted above.

The benefits of focusing the magnetic field are manifest as the field is transmitted across the gap width A from the sixth segment 18c to the third segment 16c. In their preferred embodiment, both the sixth segment 18c and the third segment 16c define a substantially planar surface surrounding the magnetically sensitive device 14. Due to electromagnetic principles, the relatively large surface areas of the third segment 16c and the sixth segment 18c create a uniform magnetic field between the two poles. Therefore, the magnetic flux density transmitted through the magnetically sensitive device 14 is uniform in space, i.e. the gradient of the magnetic field between the sixth segment 18c and the third segment 16c is approximately zero. Consequently, the measurements of the magnetically sensitive device 14 are more reliable and less prone to errors caused by spatial variations in the magnetic flux density.

After a thorough calibration, the angular position of the rotatable magnet 12 can be determined through the magnitude of the magnetic field flux density passing through the magnetically sensitive device 14. The process is illustrated in FIGS. 2 through 5.

Figure 2:
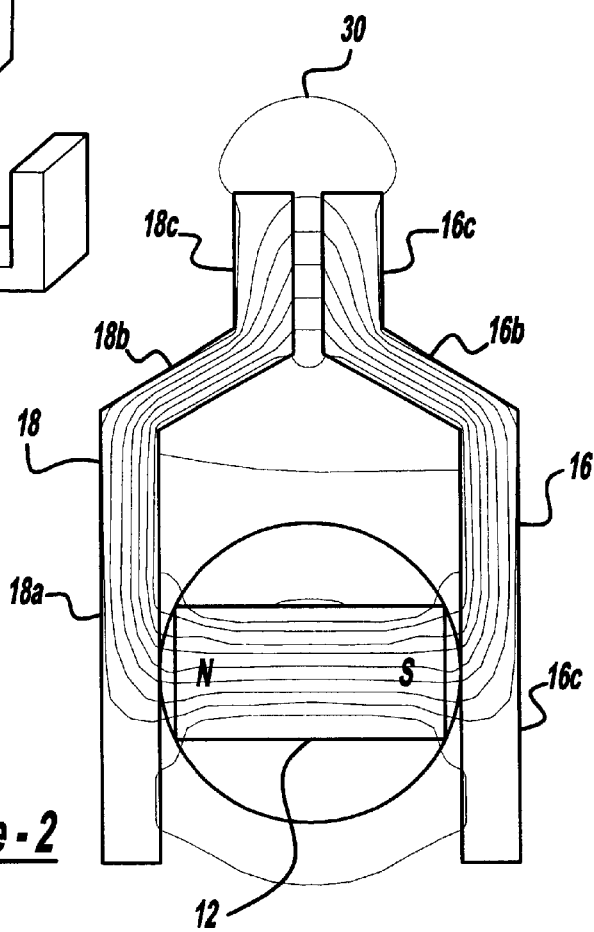
FIG. 2 depicts magnetic field contours associated with a zero degree rotation of the rotatable magnet seen in FIG. 1.

In FIG. 2, the rotatable magnet 12 is oriented in an initial position, arbitrarily referred to as a zero degree position. It is evident that any orientation of the rotatable magnet 12 could serve as a reference point for angular measurement, and therefore the following discussion is deemed non-limiting in scope. The magnetically sensitive device 14 is omitted to demonstrate the properties of the magnetic field lines 30.

As shown in FIG. 2, in a zero degree position the rotatable magnet 12 is oriented such that its north pole is nearest the fourth segment 18a, and its south pole is nearest the first segment 16a. The magnetic field 30 is depicted schematically as lines emanating from the north pole and reentering the rotatable magnet 12 through the south pole. As shown, the magnetic field 30 between the sixth segment 18c and the third segment 16c is substantially uniform.

Figure 3:
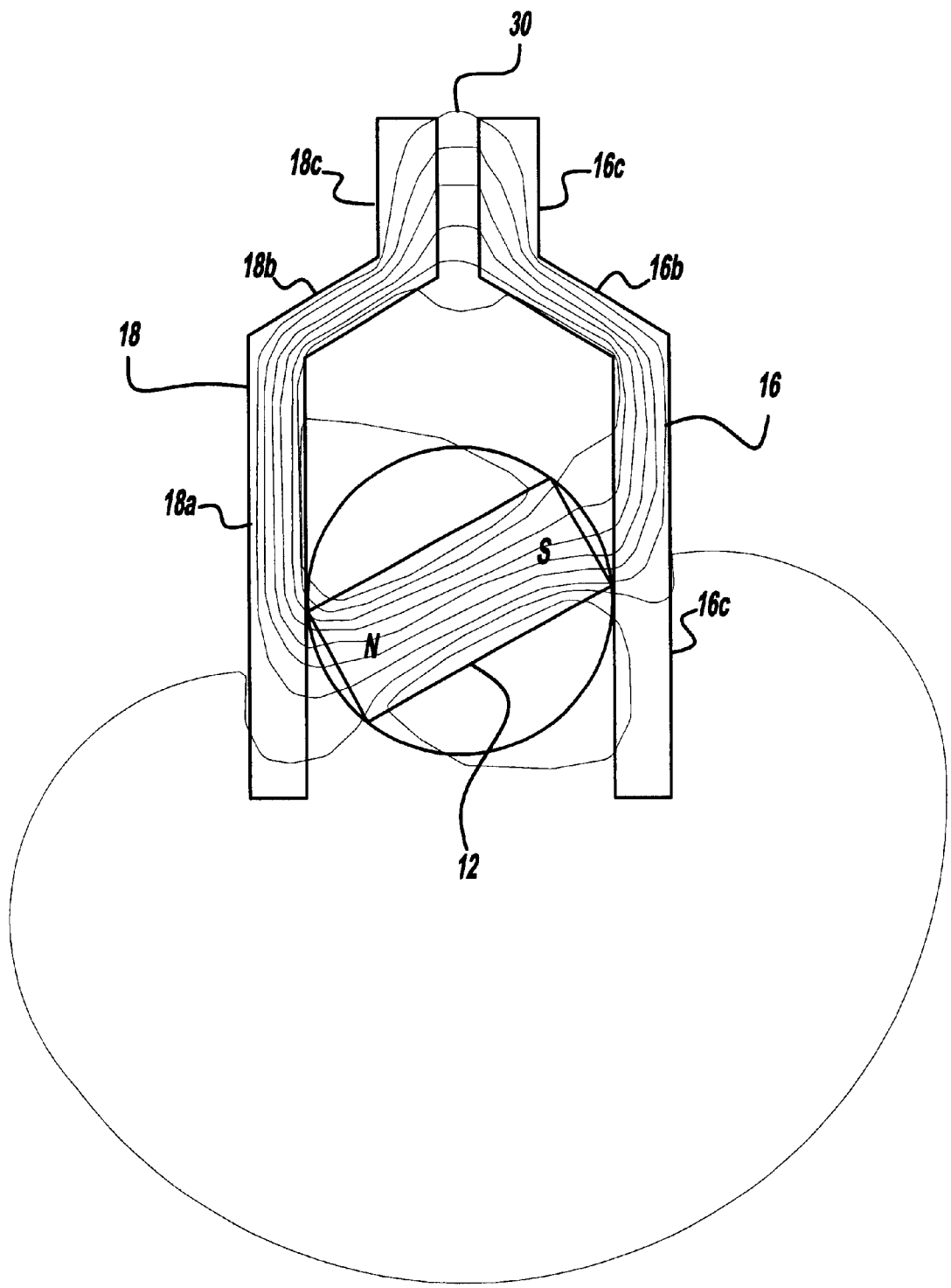
FIG. 3 depicts magnetic field contours associated with a thirty degree rotation of the rotatable magnet seen in FIG. 1.

FIG. 3 depicts the angular position sensor 10 having the rotatable magnet 12 aligned at a thirty degree angle. As illustrated, the magnetic field lines 30 are less regular between the first and second pole pieces. Nevertheless, the focusing properties of the third segment 16c and the sixth segment 18c maintain the uniformity of the magnetic field 30 through the gap width A. In spite of the spatial regularity of the magnetic field 30, minor variations in the magnetic flux density are recorded by the magnetically sensitive device 14, thus indicating a change in angular position of the rotatable magnet 14.

Figure 4:
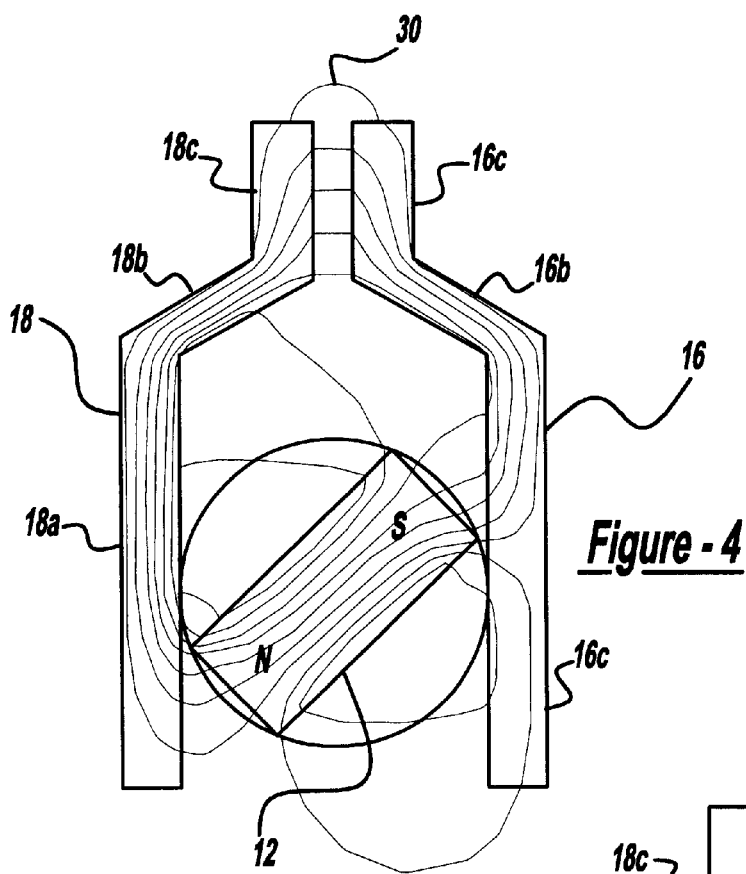
FIG. 4 depicts magnetic field contours associated with a forty-five degree rotation of the rotatable magnet seen in FIG. 1.

In FIG. 4, the angular position sensor 10 is shown having the rotatable magnet aligned at a forty-five degree angle. Compared to FIGS. 2 and 3, the magnetic field lines 30 through most of the first and second pole pieces 16, 18 are irregular. Again, the focusing properties of the third segment 16c and the sixth segment 18c maintain the uniformity of the magnetic field 30 through the gap width A. In spite of the spatial irregularity of the magnetic field 30 in the surrounding environment, the first and second pole pieces 16, 18 of the present invention expose the magnetically sensitive device 14 only to minor variations in the magnetic flux density.

Figure 5:
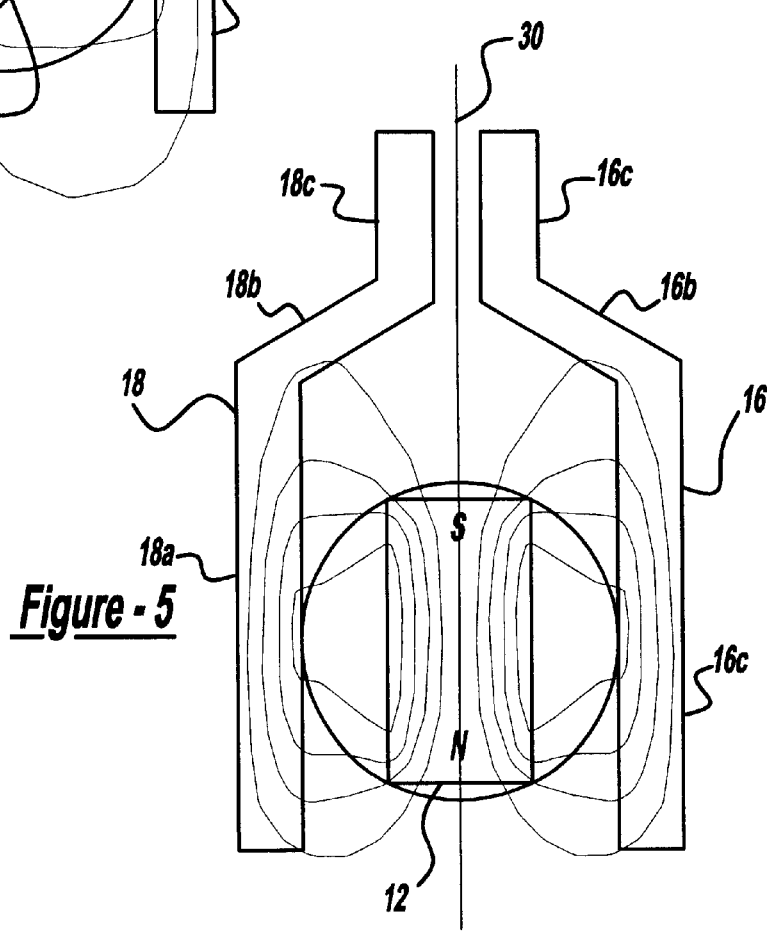
FIG. 5 depicts magnetic field contours associated with a ninety degree rotation of the rotatable magnet seen in FIG. 1.

In FIG. 5, the angular position sensor 10 is shown having the rotatable magnet aligned at a ninety degree angle. Compared to FIGS. 2, 3, and 4, the magnetic field lines through most of the first and second pole pieces are yet more irregular. As noted however, the substantially planar surfaces of the third segment 16c and the sixth segment 18c maintain the uniformity of the magnetic field through the gap width A. In spite of the spatial irregularity of the magnetic field in the surrounding environment, the magnetically sensitive device 14 is exposed only to changes in the magnetic flux density. As shown, if the rotatable magnet 12 is in a ninety-degree orientation, then the magnetically sensitive device 14 will be exposed to near zero magnetic flux density.

Figure 6:
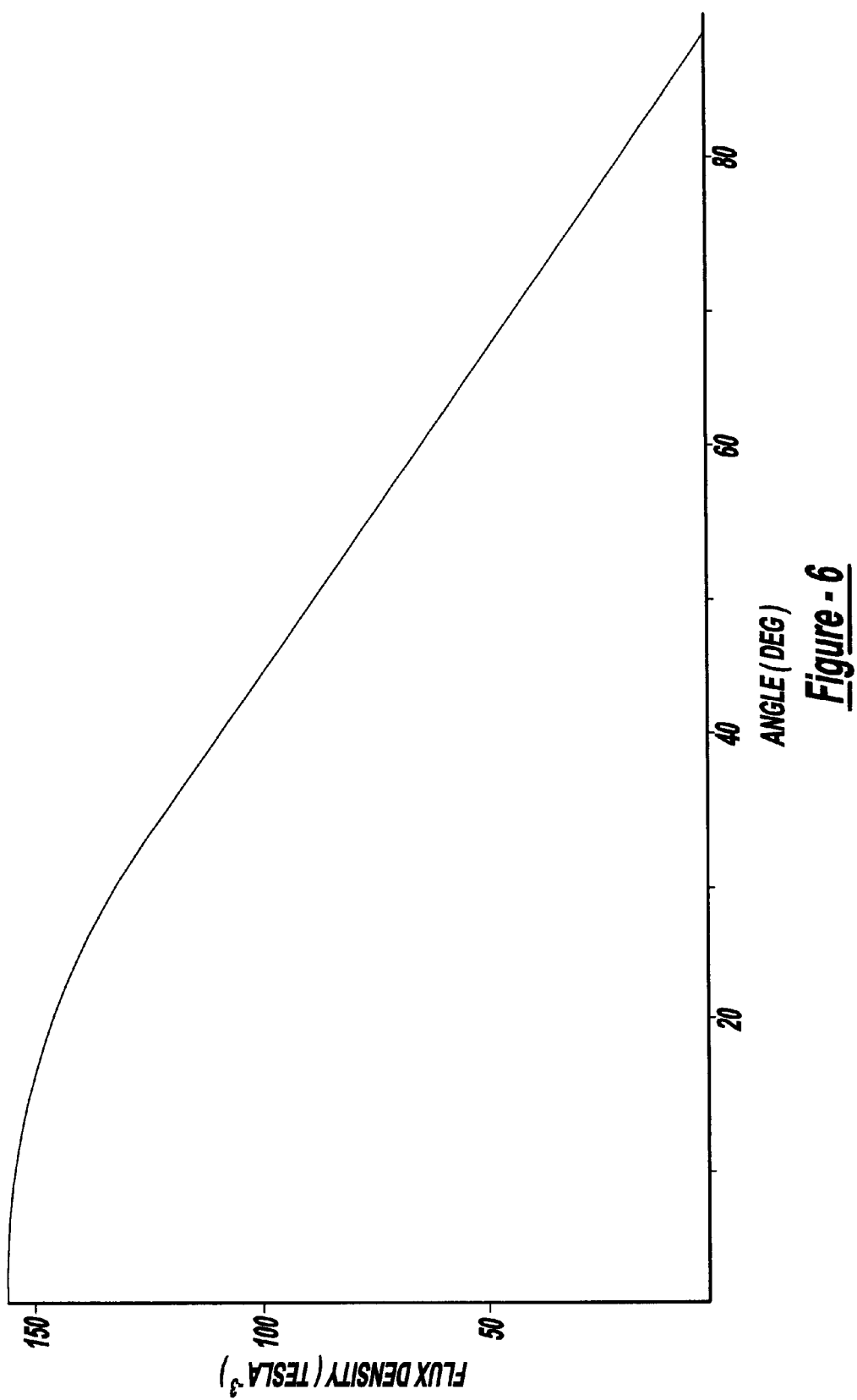
FIG. 6 is a graph demonstrating the correlation between magnetic flux density and the angular position of the rotatable magnet seen in FIG. 1.

The relationship between the angular displacement of the rotatable magnet 12 and the magnetic flux density across the gap width A is shown in FIG. 6. If the rotatable magnet 12 is in the zero degree orientation of FIG. 2, then the magnetic flux density is expected to be about 160 per cubic Tesla ($T^{-3}$). As the angular position of the rotatable magnet 12 increases towards ninety degrees, the magnetic flux density decreases to a theoretical value of zero at exactly ninety degrees. Accordingly, as shown in FIG. 5, there is no magnetic field being transmitted from the sixth segment 18c to the third segment 16c.

Figure 7:
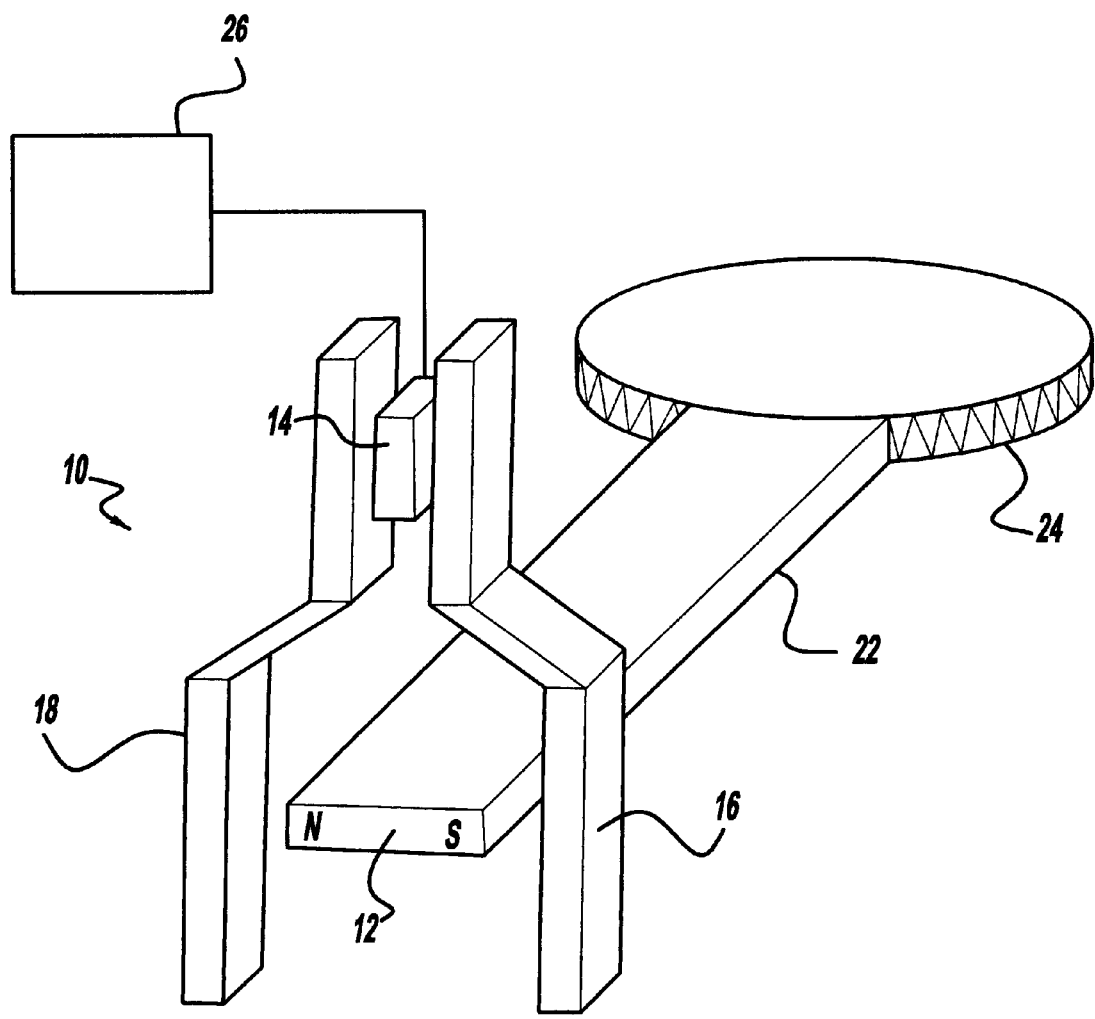
FIG. 7 is a schematic diagram of a throttle plate control system utilizing the angular position sensor of the present invention.

In a preferred embodiment schematically shown in FIG. 7, the angular position sensor 10 of the present invention is utilized for determining the angular position of a throttle plate 24. In doing so, the rotatable magnet 12 is coupled to, or made a part of, a rotatable shaft 22 attached to the throttle plate 24. As the throttle plate 24 is opened or closed, the rotatable magnet 12 is rotated between zero and ninety degrees. The first and second pole pieces 16, 18 provide an improved magnetic field distribution across the magnetically sensitive device 14, thus providing more accurate data usable in the throttle control of a motor vehicle.

As noted previously, the magnetically sensitive device 14 includes a plurality of Hall effect sensors that are preferably integrated into a circuit board adapted for processing the electrical signals generated by the rotation of the rotatable magnet 12. Preferably, there are multiple Hall effect sensors, and because of the focusing properties of the first and second pole pieces 16, 18, the information processed by the magnetically sensitive device 14 is useful in calibrating and maintaining the integrity of the throttle plate 24 position. In this application, the magnetically sensitive device 14 is coupled to a controller 26, which is adapted to process the angular position data of the throttle plate 24 for use in an electronic vehicle control system. For example, the controller 26 may be used for ensuring that the throttle plate 24 position corresponds to a driver demand for power.

The present invention as described in its preferred embodiment thus improves the accuracy and reliability of measurements related to the angular position of a rotatable magnet It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. An angular position sensor comprising:
   a rotatable magnet disposed for rotation about a first axis and generating a variable magnetic field in response to rotation about the first axis;
   a magnetically sensitive device disposed remotely from the rotatable magnet along a second axis, the second axis being perpendicular to the first axis; the magnetically sensitive device being sensitive to magnitude and direction of the variable magnetic field, and the magnetically sensitive device adapted to generate an output signal indicative of the magnitude and direction of the variable magnetic field;
   a first pole piece having a first segment, a second segment, and a third segment; and
   a second pole piece having a fourth segment, a fifth segment, and a sixth segment;
   wherein the first segment and the fourth segment are disposed about the second axis at a first distance such that the first segment and the fourth segment are mutually parallel to the second axis; and further wherein the third segment and the sixth segment are disposed about the second axis at a second distance such that the third segment and the sixth segment are mutually parallel to the second axis, the second distance being less than the first distance; and further wherein the second segment and the fifth segment are disposed about the second axis such that the second segment and the fifth segment are at an angle to the second axis, the angle being greater than zero and less than ninety degrees.

2. The angular position sensor of claim 1 further comprising a shielding member disposed about and surrounding the first segment and the fourth segment.

3. The angular position sensor of claim 1 further comprising a second shielding member disposed about and surrounding the third segment and the sixth segment.

4. The angular position sensor of claim 1 wherein the magnetically sensitive device includes at least one Hall effect sensor.

5. The angular position sensor of claim 4 wherein the at least one Hall effect sensor is integrated into a circuit board, and wherein the circuit board is adapted to process electrical signals generated by the at least one Hall effect sensor.

6. The angular position sensor of claim 1 wherein the angle is between thirty and sixty degrees.

7. The angular position sensor of claim 1 wherein the angle not less than thirty degrees and less than ninety degrees.

8. The angular position sensor of claim 1 wherein the angle is greater than zero degrees and not greater than sixty degrees.

9. The angular position sensor of claim 1 wherein the rotatable magnet is coupled to a rotatable shaft, the rotatable shaft being coupled to a throttle plate mechanism.

10. The angular position sensor of claim 1 wherein the third segment defines a substantially planar surface, and further wherein the sixth segment defines a substantially planar surface.

11. The angular position sensor of claim 10 wherein a magnetic field gradient between the third surface and the sixth surface is substantially uniform.

12. The angular position sensor of claim 1 wherein a magnetic field gradient between the third segment and the sixth segment is substantially uniform.

13. The angular position sensor of claim 1 characterized in that a magnetic field magnitude between the third surface and the sixth surface varies in response to the rotation of the rotatable magnet.

14. A throttle plate position control system comprising:
- a throttle plate coupled to a rotatable shaft, the rotatable shaft including a rotatable magnet, the rotatable magnet disposed for rotation about a first axis and generating a variable magnetic field in response to rotation about the first axis;
- a first pole piece and a second pole piece disposed about a second axis such that the first pole piece has a first end segment and the second pole piece has a second end segment, the first and second end segments transmit and focus the variable magnetic field across a gap therebetween;
- a magnetically sensitive device disposed at the gap; the magnetically sensitive device being sensitive to magnitude and direction of the variable magnetic field, and the magnetically sensitive device adapted to generate an output signal indicative of the magnitude and direction of the variable magnetic field; and
- wherein the first and second end segments have a surface area larger than the magnetically sensitive device thereby expanding the magnetic field and producing an increase in uniformity of the magnetic field.

15. The throttle plate position control system of claim 14 wherein the magnetically sensitive device is coupled to a controller; and further wherein the controller is adapted to control the throttle plate position.

16. The throttle plate position control system of claim 14 wherein the first pole piece includes a first segment, a second segment, and a third segment, wherein the third segment is the first end segment.

17. The throttle plate position control system of claim 16 wherein the second pole piece includes a fourth segment, a fifth segment, and a sixth segment, wherein the sixth segment is the second end segment.

18. The throttle plate position control system of claim 14 wherein the magnetically sensitive device includes at least one Hall effect sensor.

19. The angular position sensor of claim 18 wherein the at least one Hall effect sensor is integrated into a circuit board, and wherein the circuit board is adapted to process electrical signals generated by the at least one Hall effect sensor.

20. A throttle plate position control system comprising:
- a throttle plate coupled to a rotatable shaft, the rotatable shaft including a rotatable magnet, the rotatable magnet disposed for rotation about a first axis and generating a variable magnetic field in response to rotation about the first axis;
- a first pole piece and a second pole piece disposed about a second axis such that the first pole piece has a first end segment and the second pole piece has a second end segment, the first and second end segments transmit and focus the variable magnetic field across a gap therebetween;
- a magnetically sensitive device disposed at the gap; the magnetically sensitive device being sensitive to magnitude and direction of the variable magnetic field, and the magnetically sensitive device adapted to generate an output signal indicative of the magnitude and direction of the variable magnetic field;
- wherein the first and second end segments have a surface area larger than the magnetically sensitive device thereby expanding the magnetic field and producing an increase in uniformity of the magnetic field;
- wherein the first segment and the fourth segment are disposed about the second axis at a first distance such that the first segment and the fourth segment are mutually parallel to the second axis; and
- further wherein the third segment and the sixth segment are disposed about the second axis at a second distance such that the third segment and the sixth segment are mutually parallel to the second axis, the second distance being less than the first distance; and
- further wherein the second segment and the fifth segment are disposed about the second axis such that the second segment and the fifth segment are at an angle to the second axis, the angle being greater than zero and less than ninety degrees.

* * * * *

UNITED STATES PATENT AND TRADEMARK OFFICE
CERTIFICATE OF CORRECTION

PATENT NO. : 6,707,292 B2 Page 1 of 1
DATED : March 16, 2004
INVENTOR(S) : Jeffrey Viola It is certified that error appears in the above-identified patent and that said Letters Patent is hereby corrected as shown below:

Title page,
Item [56], References Cited, U.S. PATENT DOCUMENTS, delete "Whanna" and substitute -- Ha -- in its place.

Signed and Sealed this

Seventeenth Day of August, 2004

JON W. DUDAS
*Acting Director of the United States Patent and Trademark Office*